United States Patent [19]

Ebi et al.

[11] 4,364,057

[45] Dec. 14, 1982

[54] ELECTROSTATIC INK-JET PRINTER

[75] Inventors: Yutaka Ebi, Kawasaki; Kikuo Kubo, Yokohama, both of Japan

[73] Assignee: Ricoh Co., Ltd., Tokyo, Japan

[21] Appl. No.: 147,240

[22] Filed: May 6, 1980

[30] Foreign Application Priority Data

May 11, 1979 [JP] Japan ........ 54-57671

[51] Int. Cl.³ ........ G01D 15/8

[52] U.S. Cl. ........ 346/75; 346/140 R

[58] Field of Search ........ 346/75, 140 R, 140 A, 346/140 IJ, 140 PD

[56] References Cited

U.S. PATENT DOCUMENTS

| | | | |
|---|---|---|---|
| 2,633,796 | 4/1953 | Pethick | 346/75 |
| 3,579,245 | 5/1971 | Berry | 346/75 X |
| 4,047,185 | 9/1977 | Phillips et al. | 346/140 |
| 4,183,030 | 1/1980 | Kaieda et al. | 346/75 X |

*Primary Examiner*—G. Z. Rubinson

*Assistant Examiner*—W. J. Brady

*Attorney, Agent, or Firm*—Burgess, Ryan and Wayne

[57] ABSTRACT

An ink-landing-position control electrode is provided in such a way that one end of the control electrode is positioned adjacent to the back of a recording medium in opposed relationship with a predetermined position on the recording medium at which a charged ink drop must be deposited. The control electrode is charged oppositely of the charge on an ink drop in such a way that the electric lines of force of the electric field established by the control electrode are concentrated at the landing position, whereby a charged ink drop is forced to land at the predetermined position even when it is influenced by aerodynamic and electrostatic disturbances while it is in flight. The control electrode can also be used to eliminate an inclination of a line of dots deposited by a stream of charged ink drops issued from one nozzle when a recording medium is transported in the direction perpendicular to the traveling path of an ink-jet print head.

5 Claims, 16 Drawing Figures

ELECTROSTATIC INK-JET PRINTER

BACKGROUND OF THE INVENTION

The present invention relates to generally an electrostatic ink-jet printer and more particularly an ink-drop-landing-position control electrode disposed adjacent to the back of a recording medium so as to ensure the deposition of ink drops at their correct destinations.

In order to improve the qualities of images printed by the ink-jet printer, the particle size of ink drops must be reduced as practically as possible. However an ink drop with an extremely fine diameter cannot have kinetic energy sufficient to overcome aerodynamic and electrostatic disturbances while it is in flight. As a result, it is considerably deflected from an intended trajectory and consequently deposited at an unpredictable position, resulting in distortion of the printed image.

In order to attain a high printing speed, in the electrostatic ink-jet printers, a recording paper is in general transported in the direction perpendicular to the traveling path of a print head. That is, the recording medium is drawn upward while the print head moves transversely across the recording medium. A pair of deflection plates of the print head are arranged upright and in parallel with each other. As a result, when a line of ink dots is drawn in the horizontal direction, the firstly placed ink dot has been advanced upward by a distance depending upon the feed velocity of the recording medium from the position at which the last ink drop lands. That is, each ink drop is placed at a position lower than those of the preceding ones. As a result, the line of dots thus formed is inclined at an angle with respect to the horizontal. In the case of a multi-nozzle ink-jet print head, each line segment drawn by each nozzle is inclined so that the resulting line of dots has the form of sawteeth.

SUMMARY OF THE INVENTION

The present invention therefore has an object to provide an electrostatic ink-jet printer which can eliminate the above and other defects encountered in the prior art ink-jet printers so that the high-quality images can be printed at a high resolution.

According to one embodiment of the present invention, an ink-drop-landing-position control electrode is provided in such a way that one end of the control electrode is positioned adjacent to the back of a recording medium such as paper in opposed relationship with a predetermined position at which a charged ink drop must be landed or deposited. The control electrode is charged oppositely to the charged ink drop in such a way that the electric lines of forces of the electric field produced by the control electrode are concentrated at the predetermined position on the recording medium so that after leaving a pair of deflection plates the charged ink drop interacts with this electric field and ultimately is forced to land at the predetermined position.

According to another embodiment of the present invention, an insulating layer or the like is interposed between the control electrode and the recording medium in order to avoid the disturbance of the electric field established by the control electrode due to the distribution of the charge carried by the just-landed ink drop to the previously placed ink dots and due to the short-circuiting between the control electrode and the landed ink drop which is electrically conductive.

According to a further embodiment of the present invention, the control electrode is also used to prevent the inclination of a line of dots described above. In this case, the control electrode is inclined at an angle relative to the traveling path of a print head; that is, a line to be drawn.

According to a yet another embodiment, the control electrode comprises a pair of parallel insulated wires.

The above and other objects, effects, features and advantages of the present invention will become more apparent from the following description of preferred embodiments thereof taken in conjunction with the accompanying drawings.

DESCRIPTION OF THE PREFERRED EMBODIMENTS

PRIOR ART FIG. 1

Figure 1:
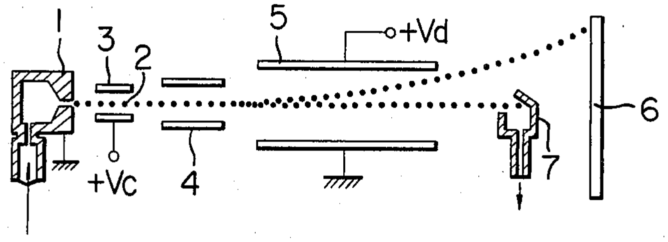
FIG. 1 PRIOR ART
FIG. 1 is a schematic view of a prior art electrostatic ink-jet printer head.

Prior to the description of some preferred embodiments of the present invention, a prior art electrostatic ink-jet printer will be briefly described with reference to FIG. 1 in order to distinctly and specifically point out the problems thereof. The ink-jet print head comprises an ink drop generator 1, a charge electrode 3, a phase control electrode 4, a pair of deflection plates 5 and a gutter 7 disposed in front of a recording paper 6. An ink drop 2 issued from the nozzle of the ink drop generator 1 is charged by the charge electrode in response to the voltage signal from a character forming circuit (not shown). The charged ink drop passes through the phase control electrode 4 so that the phase of the charged ink drop may be adjusted suitably. After leaving the phase control electrode 4, the charged ink drop passes between the deflection plates 5 so that it is deflected by a predetermined angle depending upon a charge on the ink drop 2 so as to land on a predetermined position on the recording paper 6. An uncharged ink drop is not deflected so that it travels along a substantially straight path and is trapped by the gutter for recirculation.

The electrostatic ink-jet printer of the type just described above has a resolution of the order of 8 to 9 lines per millimeter. The diameter of the ink drops is of the order of 100 micrometers so that the ink drop has a relatively high kinetic energy and consequently there arises no problem of misplacement of ink drops due to the aerodynamic and electrostatic disturbances to be described in detail below.

It is obviously a natural trend that the images with high qualities are demanded. To this end, there has been proposed an ink-jet printer in which the diameter of the nozzle of an ink drop generator is reduced as much as possible so as to generate the ink drops with an extremely fine diameter, whereby the density of ink dots can be increased and consequently the resolution can be improved. For instance, the ink drops with the diameter of 50 micrometers are used in practice. However, an ink drop with such an extremely fine particle size has no kinetic energy sufficient to overcome the aerodynamic and electrostatic disturbance while it is in flight. That is, when an ink drop travels from the nozzle of the ink drop generator 1 to the recording paper 6, it is easily susceptible to the aerodynamic and electrostatic disturbances so that it is deflected from a predetermined flight path or trajectory and ultimately lands at an unpredictable position on the paper 6. As a result, the displacement of ink drops results with the resultant distortions of the printed image.

More specifically, assume that the ink drop generator 1 has the nozzle with the diameter of 30 micrometers, is exerted with the synchronizing signal of 100 KHz and issues a stream of ink drops at the velocity of 20 m/sec. Then each ink drop has the kinetic energy of the order of $2.76\times10^{-8}$ joules. When an ink drop is issued from an ink drop generator which has the nozzle with the diameter of 50 micrometers and is excited with the synchronizing signal of 50 KHz, it has the kinetic energy of $1.28\times10^{-7}$ joules. Thus it is seen that the kinetic energy imparted to an ink drop varies over a wide range depending upon the pressure of the ink in the ink drop generator, the size of the nozzle and the frequency of the synchronizing signal.

In addition, in the case of a multi-nozzle ink-jet print head, the kinetic energy imparted to each ink drop varies depending upon the dimensional errors or difference in the diameter and length as well between the nozzles. Furthermore, the variations in the level of the kinetic energy are also caused by the pulsation of an ink pump for recirculating the ink to the ink drop generator. Thus the nozzles must be fabricated with a higher degree of dimensional accuracy and the pumps used must be highly reliable and dependable in operation.

The present invention was made to overcome the above and other problems encountered in the prior art electrostatic ink-jet printers, and has for its object to provide an ink-jet printer which can completely avoid any misplacement of ink drops even when the ink drops have a low level of kinetic energy because the diameter of the nozzle is reduced and/or because of the dimensional difference between the nozzles, ink pressure fluctuation and other causes described above, so that the ink drops become susceptible to the aerodynamic and electrostatic disturbances, whereby the images with a higher degree of resolution can be printed.

Briefly stated, to the above and other ends, the present invention provides an ink-jet printer in which ink-drop-landing-position control electrodes are located in a platen or the like in the form of a matrix corresponding to the ink-dot matrix so that even when the ink drops are subjected to the aerodynamic and electrostatic disturbances while they are in flight, respective ink drops are forced to land correctly at their predetermined positions on a recording paper or the like, whereby the misplacement of ink drops can be avoided and consequently the images with a higher degree of resolution can be obtained.

FIRST EMBODIMENT, FIGS. 2 AND 3

Figure 2:
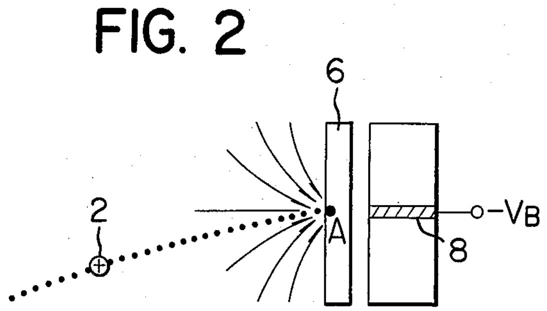
FIG. 2 is a view used for the explanation of the underlying principle of the present invention.
Figure 3:
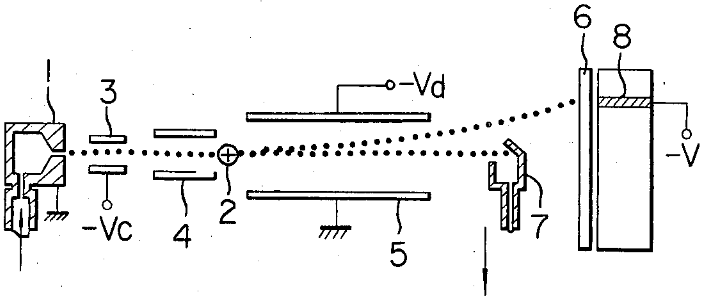
FIG. 3 is a schematic view of a first embodiment of the present invention.

In FIG. 2 is shown the fundamental construction of the present invention in which an ink-drop-landing-position control electrode 8 is disposed behind and perpendicular to the recording paper 6 in such a way that one free end (in opposed relationship with the recording paper 6) of the rod- or pin-shaped control electrode 8 is located in opposed relationship with a predetermined landing position A. When the ink drops are positively charged, the control electrode 8 is negatively charged with a negative voltage of $-V_B$, and vice versa. As a result, as shown in FIG. 2, the electrostatic lines of the electric field produced by the control electrode 8 are converged at the free end thereof. Therefore when the positively charged ink drop 2 approaches the recording paper 6, it is subjected to the influence of the electric field produced by the control electrode 8 so that it is accelerated and forced to land at the predetermined position A. In other words, even when the ink drop 2 is deflected from its predetermined trajectory or flight path under the influence of the aerodynamic and electrostatic disturbances, it is forced to land correctly at the predetermined position A under the "correcting or compensating force" provided by the control electrode 8. Furthermore the control electrode 8 has the function of electrically clamping the recording paper 6 in a predetermined position so that the ink-dot-placement accuracy can be further improved.

According to the results of the extensive studies and experiments conducted by the inventor, it is found out that when the charging voltage Vc is 100 V; the deflection voltage Vd is 2.5 KV and the voltage $V_B$ applied to the control electrode 8 is 500 V, the ink drop 2 lands at the predetermined position A with a higher degree of accuracy.

SECOND EMBODIMENT, FIG. 4

Figure 4:
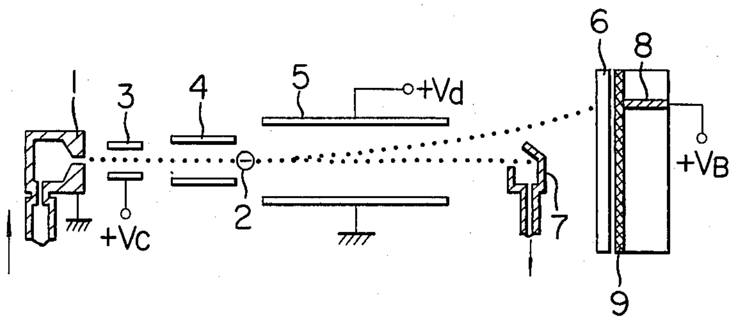
FIG. 4 is a schematic view of a second embodiment of the present invention.

A second embodiment shown in FIG. 4 is substantially the same in construction to the first embodiment just described above except that an insulating layer or the like 9 is interposed between the control electrode 8 and the recording paper 6. The insulating layer or the like 9 is made of for instance a film of polyethylenetelephthalate. As ink is electrically conductive, the electric field on the position to be printed is desturbed owing to short-circuiting between the adjacent control electrodes by the charged and previously landed ink drops on the recording paper 6. The insulating layer 9 serves to prevent the above-mentioned disturbance of the electric field. The insulating layer or the like 9 must be thin because when it is thick, considerable adverse effects arise due to the polarization of the insulating layer or the like.

THIRD EMBODIMENT, FIGS. 5 AND 6

Figure 5:
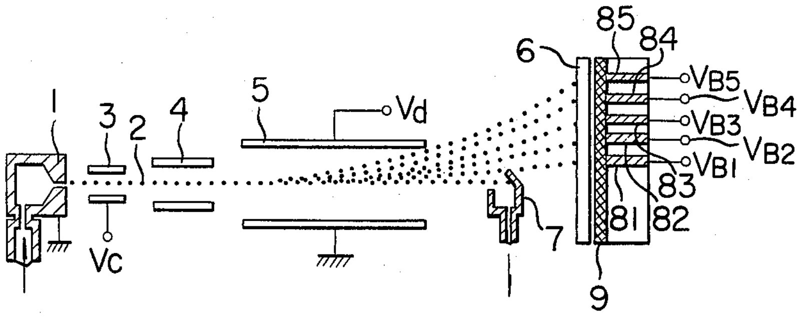
FIG. 5 is a schematic view of a third embodiment of the present invention.
Figure 6:
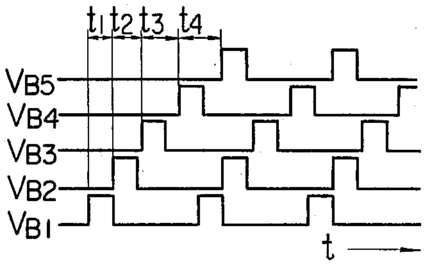
FIG. 6 shows a timing diagram for sequentially applying the control voltages to a plurality of control electrodes.

A third embodiment shown in FIG. 5 is substantially similar in construction to the second embodiment just described above except that a plurality of control electrodes 81 through 85 are located in opposed relationship to the predetermined landing positions spaced apart from each other along a vertical line segment. Therefore in synchronism with the step-wise variations in deflection angle of the charged ink drops, the voltages are impressed to the control electrodes 81 through 85 with a timing as shown in FIG. 6. In this case, the following fact must be taken into consideration when a timing is determined. That is, the greater the deflection angle of a charged ink drop, the longer it is subjected to the aerodynamic and electrostatic disturbances before it lands on the recording paper 6. Therefore the following relationship must be held:

$$t_1 < t_2 < t_3 < t_4$$

The first, second and third embodiments may be summarized as follows. The ink-drop-landing-position control electrode 8 is located in such a way that the free end of the control electrode 8 is in opposed relationship with a predetermined ink-dot-placement position A on the recording paper 6. The control electrode 8 is charged oppositely to the charged ink drop in such a way that the electrostatic lines converge at the predetermined position A. As a result, even when the charged ink drop has been deflected from its predetermined flight path due to the aerodynamic and electrostatic disturbances while it is in flight, it is forced to land at the predetermined position A. As a consequence, a high-quality image without any distortion can be printed. In addition, the difference in dimensional accuracy of the nozzles can be compensated for.

PRIOR ART, FIGS. 7 THROUGH 9

Prior to the description of further embodiments of the present invention, the problems encountered in the prior art ink-jet printers, which the present invention contemplates to overcome, will be distinctly and specifically pointed out.

Figure 7:
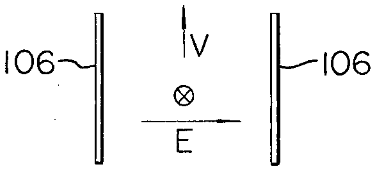
FIG. 7 PRIOR ART
FIGS. 7 and 8A are views used for the explanation why the inclination of a line of dots placed by a prior art ink-jet printer occurs.
Figure 8A:
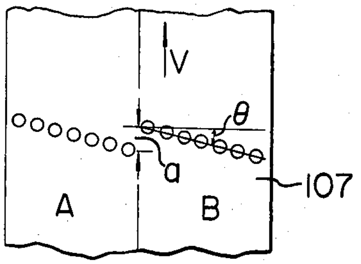
FIG. 8A PRIOR ART

In general, in order to attain a higher degree of printing efficiency, in the prior art ink-jet printers the recording paper is transported in its longitudinal direction while the ink-jet print head is moved transversely across the recording paper. For instance, as shown in FIG. 7, the recording paper 107 is transported vertically and the deflection plates 106 are erected upright so that the charged ink drops are deflected in a horizontal plane. With this arrangement, assume that a horizontal line segment be printed. Then this line segment is printed dot by dot, not by the simultaneous landing of all the required ink drops along the line segment. As a result, the ink dots cannot be placed in exact alignment with a desired horizontal line segment and the resultant line segment inclines at an angle $\theta$ as shown in FIG. 8A. In the case of a multi-nozzle ink-jet print head, a section of a line segment printed by each nozzle is inclined as shown at A and B in FIG. 8A so that at the boundary between the sections A and B, the firstly placed ink dot of the section B is spaced apart from the lastly placed ink dot of the section A by a distance a. As a result, the horizontal line segment printed is distorted. Assume that the recording paper be transported at the velocity Vp relative to the nozzle and the time interval required for printing a full horizontal line be $\Delta t$. Then the lastly placed ink dot is displaced relative to the firstly placed ink dot by $Vp \times \Delta t$.

Figure 8B:
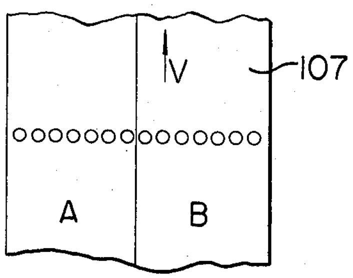
FIG. 8B shows a straight horizontal line segment of dots placed by an ink-jet print head of the present invention.
Figure 9:
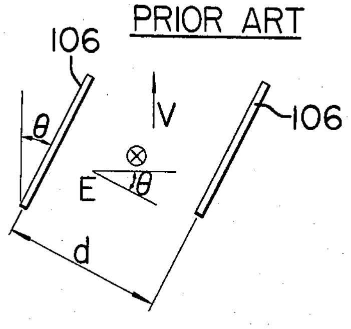
FIG. 9 PRIOR ART
FIG. 9 shows a pair of inclined, parallel deflection plates of a prior art ink-jet print head for eliminating the inclination of a line of dots as shown in FIG. 8A.

In order to overcome this problem, there have been proposed various methods. For instance, Japanese Patent Application Laid Open No. 48-58730 and Japanese Utility Model Publication No. 52-13866 disclose the arrangement of deflection plates as shown in FIG. 9. That is, the deflection plates 106 are inclined at an angle $\theta$ relative to the vertical or the direction in which the recording paper 107 is transported so that the direction of the electric field E is inclined at an angle $\theta$ relative to the horizontal. As a result, the inclination of the line segment formed by the ink dots can be eliminated and even in the case of a multi-nozzle ink-jet print head the sections printed by respective nozzles can be made horizontal and continuously in line with each other as shown in FIG. 8B.

However, the above-described remedy has a drawback that the angle of inclination $\theta$ must be adjusted depending upon the transportation velocity Vp of the recording paper 107. Furthermore, it is extremely difficult to maintain the angle $\theta$ in the production line. In addition, the distance d between the deflection plates 106 must be maintained with a higher degree of accuracy because the deflection plates 106 are inclined as described above. In the case of a multi-nozzle ink-jet print head, all of the deflection pairs must be inclined correctly at a predetermined angle and the distance between the deflection plates must be maintained with a higher degree of accuracy. As a result, the fabrication of the multi-nozzle print heads presents considerable difficulties.

The present invention also provides an ink-jet printer or more specifically a print head with one or more pairs of upright parallel deflection plates which can eliminate the inclination of a line of ink dots and the misalignment between the sections of a line of ink dots printed by separate nozzles as will be described in detail hereinafter.

FOURTH EMBODIMENT, FIGS. 10 AND 11A AND 11B

Figure 10:
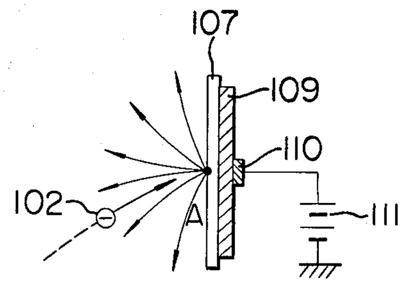
FIG. 10 is a view similar to FIG. 2 except that a control electrode is positively charged.
Figure 11A:
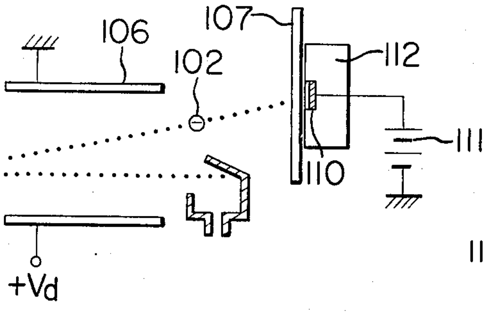
FIGS. 11A and 11B are views used for the explanation of a fourth embodiment of the present invention.
Figure 11B:
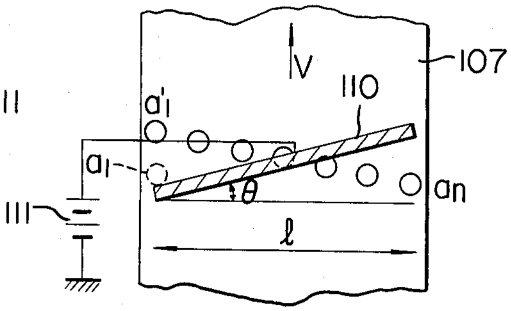

Referring to FIGS. 10, 11A and 11B, an insulating layer or the like 109 is made into contact with the recording paper 107 and an auxiliary or compensating electrode 110 is mounted on the insulating layer or the like 109 and inclined at an angle $\theta$ with respect to the horizontal. The auxiliary or compensating electrode 110 is connected to a DC power supply 111 so that it is charged oppositely to the charged ink drop 102. That is, when the ink drop 102 is negatively charged, the auxiliary or compensating electrode 110 is positively charged, and vice versa. As described elsewhere, the insulating layer or the like 109 is provided in order to prevent the disturbance of the electric field and must be thin.

The electric lines of the field produced by the auxiliary or compensating electrode 110 leave from a predetermined position A at which an ink drop lands or is deposited as best shown in FIG. 10. Therefore after leaving the deflection plates 106, the charged ink drop 102 is influenced by the electric field produced by the auxiliary or compensating electrode 110 and is forced to accelerate and land at the predetermined position A. Furthermore, as described elsewhere, the recording paper 107 is more positively clamped by the electric field so that the correct disposition or placement of ink dots can be ensured.

In a fourth embodiment shown in FIGS. 11A and 11B, the auxiliary or compensating electrode 110 is mounted on an auxiliary electrode unit 112 and is inclined at an angle $\theta$ relative to the horizontal. It is assumed that the print head be moved transversely across the recording paper 107 from the left to the right while the recording paper 107 is drawn upward at a velocity V, thereby printing a line of dots $a_1$ through $a_n$ which are sequentially deposited in the order named.

Let $a_1'$ denote the position of the firstly placed ink dot $a_1$ when the last dot $a_n$ is deposited and let l denote the horizontal distance between the first and last ink dots $a_1$ and $a_n$. Then the angle $\theta$ of inclination of the auxiliary or compensating electrode 110 is given by the following equation.

$$\theta = \frac{a'_1(x,y) - a_1(x,y)}{l}$$

The direction of the inclination is opposite to that of a line of dots (See also FIG. 8A) when no compensating means is employed; that is, a line connecting between the dots $a_1'$ and $a_n$ in FIG. 11B. When the print head moves from the right to the left, the direction of the inclination of the auxiliary or compensating electrode 110 becomes opposite. Furthermore, it is obvious that the higher the deflection voltage +Vd, the greater the angle $\theta$ becomes.

The auxiliary or compensating electrode 110 is connected to a DC power supply and is charged oppositely to the charged ink drop 102. That is, when the ink drop 102 is negatively charged, the electrode 110 is positively charged as shown, and vice versa.

After leaving the deflection plates 106, the charged ink drops 102 are influenced by the electric field established by the auxiliary or compensating electrode 110 so that the first ink drop is subjected to the downwardly pulling force and the last ink drop to the upwardly pulling force while the intermediate ink drops are subjected to the downwardly or upwardly pulling force depending upon their destination on the recording paper 107. In consequence, the ink dots $a_1$ through $a_n$ are correctly lined up in the horizontal direction so that a straight line segment can be drawn. In other words, the misplacement of ink drops due to the upward movement of the recording paper 107 relative to the print head can be eliminated.

The voltage impressed to the auxiliary or compensating electrode 110 is determined depending upon various factors such as the feed velocity of the recording paper 107, the issuing velocity of the ink drops and so on.

According to the fourth embodiment of the present invention, the deflection plates are not needed to be inclined as in the case of the prior art ink-jet print head. Only the auxiliary or compensating electrode 110 is inclined at an angle so that the fabrication of print heads becomes considerably easy.

In the case of a multi-nozzle ink-jet print head, a plurality of auxiliary or compensating electrodes 110 (equal in number to the nozzles) are arrayed in the horizontal direction in a manner substantially similar to that just described above. As a result, the misalignment between the sections or line segments printed by respective nozzles can be eliminated. Obviously the fabrication of the multi-nozzle ink-jet print heads can be considerably simplified as compared with the prior art multi-nozzle ink-jet print heads where all deflection plates must be inclined at an angle as described above.

FIFTH EMBODIMENT, FIGS. 12A AND 12B

Figure 12A:
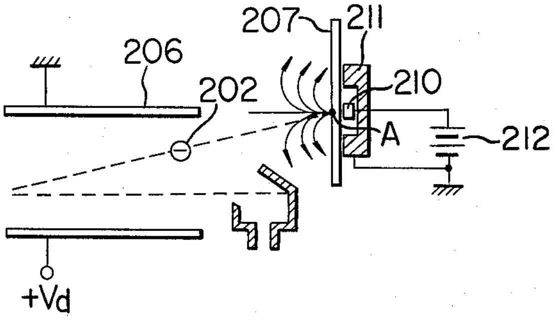
FIG. 12A is a fragmentary schematic view of a fifth embodiment of the present invention.
Figure 12B:
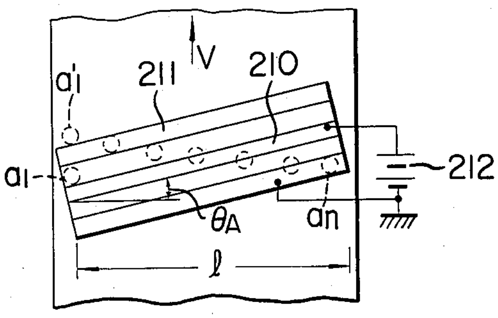
FIG. 12B is a view used for the explanation of the position of the control electrode shown in FIG. 12A relative to the recording paper.

A fifth embodiment shown in FIGS. 12A and 12B is substantially similar in construction to the fourth embodiment just described above with reference to FIGS. 11A and 11B except that the auxiliary or compensating electrode 210, which is inclined at an angle $\theta_A$, is enclosed by a shielding electrode 211 which is grounded. As with the fourth embodiment, the auxiliary or compensating electrode 210 is connected to a DC power source 212 and is charged oppositely of the charged ink drop 202. That is, when the ink drop is negatively charged, the auxiliary or compensating electrode 210 is positively charged as shown, and vice versa.

The mode of operation of the fifth embodiment also is substantially similar to that of the fourth embodiment just described above except that the electric field established by the auxiliary or compensating electrode 210 is enhanced by the provision of the shielding electrode 211 so that the charged ink drops 202 are subjected to stronger upwardly or downwardly pulling forces and consequently a straight horizontal line can be printed.

The angle $\theta_A$ of inclination of the auxiliary or compensating electrode 210 must be greater than the angle $\theta$ of the uncompensated line of ink dots shown in FIG. 8A. That is, let $\theta_A = a\theta$, where a is a proportionality constant. Then it is preferable that the constant a is equal to or greater than one but is equal to or less than 2, ($1 \leqq a \leqq 2$). The angle $\theta$ is obtained in the manner described above with reference to the fourth embodiment. Therefore the angle $\theta_A$ is obtained by multiplying the angle $\theta$ by a suitable constant a.

SIXTH EMBODIMENT, FIG. 13

Figure 13:
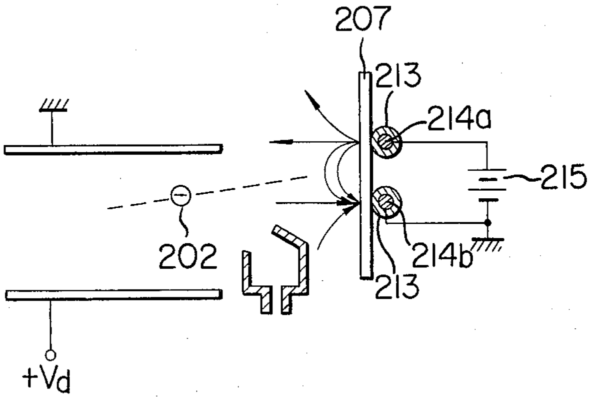
FIG. 13 is a view used for the explanation of a sixth embodiment of the present invention.

In a sixth embodiment shown in FIG. 13, instead of the auxiliary or compensating electrode 110 or 210, two wires **214*a* and 214*b* which are covered with an insulating material 213 such as Teflon or the like are extended transversely across the recording paper 207** at an angle $\theta_A$ relative to the horizontal and spaced apart from each other in the vertical direction by a predetermined distance. The angle $\theta_A$ is determined in the manner described elsewhere.

The upper insulated wire **214*a* is impressed with a positive voltage while the lower insulated wire 214*b* with a negative voltage so that the electric field is established as indicated by the electric lines of force. As a result, after leaving the deflection plates, the ink drop 202**, which is shown as being negatively charged, is accelerated and forced to land at a predetermined position along a straight horizontal line to be printed in a manner substantially similar to that described above with reference to the fourth and fifth embodiment, whereby a straight horizontal line can be printed.

The wires **214*a* and 214*b*** are insulated in order to prevent the dielectric breakdown caused when there exists no recording paper or when the wires are wetted.

Referring back to FIGS. 12A and 12B, because of the provision of the shielding electrode 211 which may be called "an electric field-intensifying means" the charged ink drops are subjected to stronger upwardly or downwardly pulling or drawing forces as described above. The voltage applied to the auxiliary or compensating electrode 210 is determined depending upon various factors such as the feeding speed of the recording paper, the issuing velocity of ink drops and so on as described elsewhere.

As with the case of the fourth embodiment, according to the fifth and sixth embodiments, the fabrication of print heads is much easier when compared with the prior art print heads with the inclined deflection plates. Same is true for the multi-nozzle print heads in which a plurality of auxiliary or compensating electrodes 210 with the shielding electrodes 211 or a plurality of insulated wires 214*a* and 214*b* are arrayed in a manner substantially similar to that described above.

What is claimed is:

1. An electrostatic ink-jet printer comprising:

(a) means for forming charged ink drops;

(b) a recording medium;

(c) means for deflecting the charged ink drops, interposed between the charged ink drop forming means and the recording medium;

(d) an insulating layer disposed adjacent to the back of the recording medium; and (e) an ink-drop-landing-position control electrode provided in such a way that one end of said control electrode is positioned adjacent to the insulating layer at the back of a recording medium in opposed relationship with a predetermined position on said recording medium at which a charged ink drop must be deposited or placed, a control voltage is applied to said control electrode in such a way that the electric lines of force of the electric field established by said control electrode are concentrated substantially at said predetermined landing position, the polarity of said control voltage being opposite to that of the charge on the ink drops.

2. An electrostatic ink-jet printer as set forth in claim 1 further characterized in that said control electrode is inclined at an angle with respect to the path of the movement of a print head.

3. An electrostatic ink-jet printer as set forth in claim 2 further characterized in that said control electrode is extended along the whole length of a line segment along which one nozzle of said print head can deposit a predetermined number of ink drops, and said control electrode is provided with a means capable of enhancing the electric field established by said control electrode.

4. An electrostatic ink-jet printer as set forth in claim 3 further characterized in that said electric-field enhancing means comprises a shielding electrode surrounding said control electrode.

5. An electrostatic ink-jet printer as set forth in claim 3 further characterized in that said control electrode and said electric-field enhancing means comprises at least one pair of insulated wires which are spaced apart from each other by a predetermined distance in parallel with each other and are applied with a positive voltage and a negative voltage, respectively.

* * * * *